April 9, 1935.  E. W. B. GILL  1,997,053
SHORT WAVE OSCILLATION GENERATOR
Filed Feb. 25, 1933
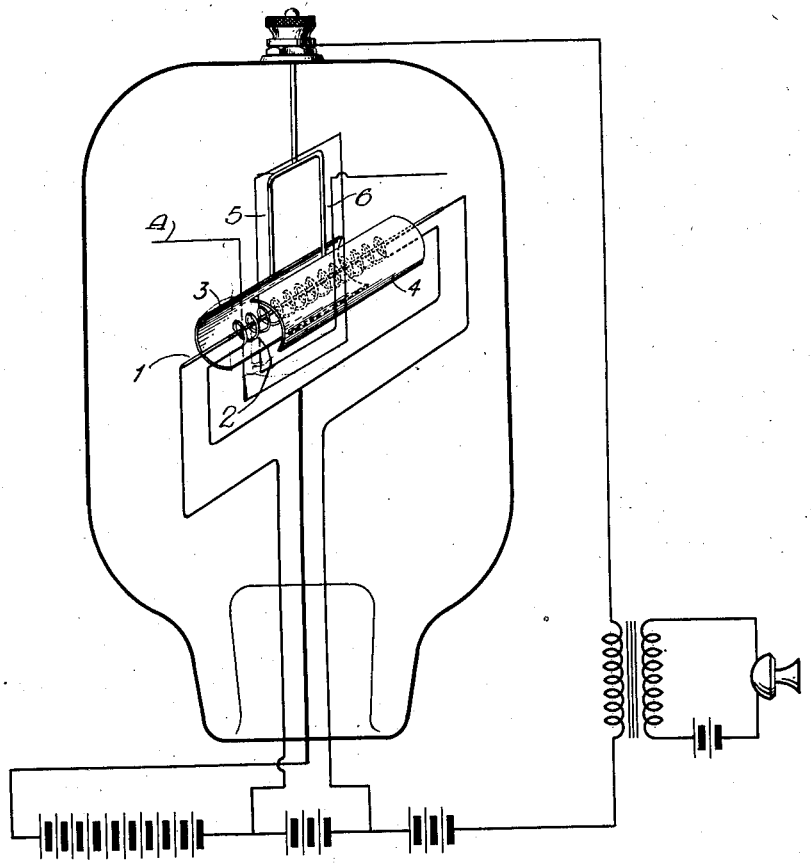
INVENTOR
ERNEST W. B. GILL
BY
ATTORNEY Patented Apr. 9, 1935

1,997,053

UNITED STATES PATENT OFFICE 1,997,053

SHORT WAVE OSCILLATION GENERATOR

Ernest Walter Brudenell Gill, Oxford, England, assignor to Radio Corporation of America, a corporation of Delaware Application February 25, 1933, Serial No. 658,583
In Great Britain February 27, 1932

6 Claims. (Cl. 250—36)

This invention relates to short wave oscillation generators and more particularly to short wave thermionic valve generators operating on the so-called Barkhausen-Kurz principle, wherein there is a to and fro motion of the electrons about the grid, due primarily to the application of a high positive potential to the grid relative to the cathode and the anode. A well known form of oscillator of this type consists of a thermionic valve whose plate is connected to its grid through a circuit consisting of a pair of Lecher wires connected together in series by a capacity, one Lecher wire being connected to the plate and the other to the grid. A relatively high positive potential is applied to the grid from a connection taken to the grid side of the condenser and the circuit is completed by a connection taken from the plate side of the condenser to the cathode. The condenser between the two Lecher wires is relatively large and can be regarded as a potential node for the oscillations, the said oscillations occurring (when the space between the grid and anode is saturated) along the Lecher wires and into the small capacity constituted by the anode-grid self-capacity of the valve.

While the present invention is not to be deemed to be restricted or affected in any way by the accuracy or otherwise of the theory now to be advanced, it is believed that oscillations are maintained by electrons from the cathode saturating the space between grid and plate, in which condition the number of electrons entering this space depends on the number already there. Any periodic removal of the latter to the plate causes a regenerative action on the system by the former. At any rate it is found that alteration of the grid potential or the distance between the grid and anode affects the periodicity. It is found that the electronic current reaches the anode in proper phase relative to the alternating potential of the anode to cause regeneration of the oscillations, but with a known arrangement such as that above described the grid current variations which, of course, are necessarily involved by anode current variations are in general in such phase that instead of tending to regenerate the oscillations they damp them.

The present invention has for its object to provide an improved arrangement operated on the Barkhausen-Kurz principle and wherein the action of the grid current tending to oppose oscillation is avoided.

According to this invention the electrodes of a thermionic oscillator operating on the Barkhausen-Kurz principle are so arranged and the connections to these electrodes are so chosen that the grid is in effect caused to be positioned at or substantially at a potential node in the oscillating circuit.

Preferably the grid is constituted by a very open helix or mesh of very fine wire, and has the minimum amount of metal supports. In this way the space between the grid and anode may be made to carry the required saturation current without the grid being subjected to excessive bombardment.

The invention is illustrated in the accompanying drawing which shows diagrammatically one electrode arrangement in accordance therewith.

Referring to the drawing, a thermionic valve having a central straight cathode 1, a cylindrical grid 2 surrounding said cathode and a pair of part cylindrical anodes 3, 4, one on each side of said grid, is employed. It is found that to obtain satisfactory results, the anode diameter should be not less than 2½ times the grid diameter with this construction of valve. The two anode electrodes are connected together through a pair of Lecher wires 5, 6, in series, the large condenser ordinarily employed to connect these Lecher wires in series to one another being, if desired, and preferably, omitted. An antenna A is shown connected diagrammatically, and by way of example only to the wires 5, 6. A positive potential from a source is applied to the grid and the junction point of the two Lecher wires is connected to the cathode. With this arrangement oscillations will occur along the Lecher wires and will be such that a potential node occurs at the junction point between them, the oscillations taking place into the two condensers constituted by the effective capacity between one anode and the grid and the other anode and the grid, the grid being thus another potential node.

One suitable method of modulating oscillations produced by the valve is shown, wherein the modulating voltages are applied to the anode circuit.

The arrangement presents the following advantages:

1. The provision of the condenser hitherto provided between the Lecher wires is rendered unnecessary.

2. The leads inside the valve for taking potential to the grid and cathode may be so arranged that there is practically no coupling between them and the oscillatory circuit, i. e., the grid and cathode leads may be taken down through the footstep of the valve and the anode leads taken through the envelope of the valve opposite one another, and 3. The whole oscillatory circuit can, if desired, be arranged inside the valve, thus eliminating any resistance losses due to leads passing through the valve, e. g., through the pinches. In one arrangement of this kind, the two anodes are connected together by a loop or wire arranged within the valve envelope, said wire constituting the two Lecher wires. A connection is led from the midpoint of this wire (which is a nodal point) through the valve envelope preferably at the top, this connection being brought down to the cathode point.

Having now particularly described and ascertained the nature of my said invention and in what manner the same is to be performed, I declare that what I claim is:

1. A thermionic oscillator comprising a thermionic valve having a cathode, a grid surrounding said cathode, and a pair of anodes one on each side of said grid, a pair of Lecher wires connected in series between said anodes, a connection between the junction point of said Lecher wires and the cathode, and means for applying a positive potential to said grid relatively to said anode and to said cathode.

2. An oscillator as claimed in claim 1, and in which the grid of the valve is constituted by a very open helix substantially as described.

3. An oscillator as claimed in claim 2 and in which the whole oscillatory circuit is arranged within the valve, substantially as described.

4. A thermionic oscillator comprising a thermionic valve having a cathode, a grid surrounding said cathode, and a pair of anodes one on each side of said grid, a pair of Lecher wires connected in series between said anodes, a connection between the junction point of said Lecher wires and the cathode, and means for applying a positive potential to said grid relatively to said anode and to said cathode, means for modulating the oscillations produced by said oscillator, and a utilization circuit for said modulated oscillations.

5. A thermionic oscillator comprising a thermionic valve having a cathode, a grid surrounding said cathode, and a pair of anodes one on each side of said grid, said anodes being of part cylindrical shape and positioned to lie along opposite sides of the curved surface of an imaginary cylinder whose diameter is not less than 2½ times that of an imaginary cylinder in whose curved surface the grid lies, a pair of Lecher wires connected in series between said anodes, a connection between the junction point of said Lecher wires and the cathode, and means for applying a positive potential to said grid relatively to said anodes and to said cathode.

6. A thermionic oscillator comprising a thermionic valve having a cathode, a grid surrounding said cathode, and a pair of anodes one on each side of said grid, a pair of Lecher wires connected in series between said anodes, all within a single envelope, a connection between the junction point of said Lecher wires and the cathode, said connection extending through the envelope of said valve, and means for applying a positive potential to said grid relatively to said anode and said cathode, the leads to said cathode extending through the envelope of said valve opposite the point of entrance of said connection to said Lecher wires.

ERNEST WALTER BRUDENELL GILL.